June 4, 1957 R. HEIDECKE ET AL 2,794,381
PHOTOGRAPHIC CAMERA
Filed May 16, 1955 4 Sheets-Sheet 2
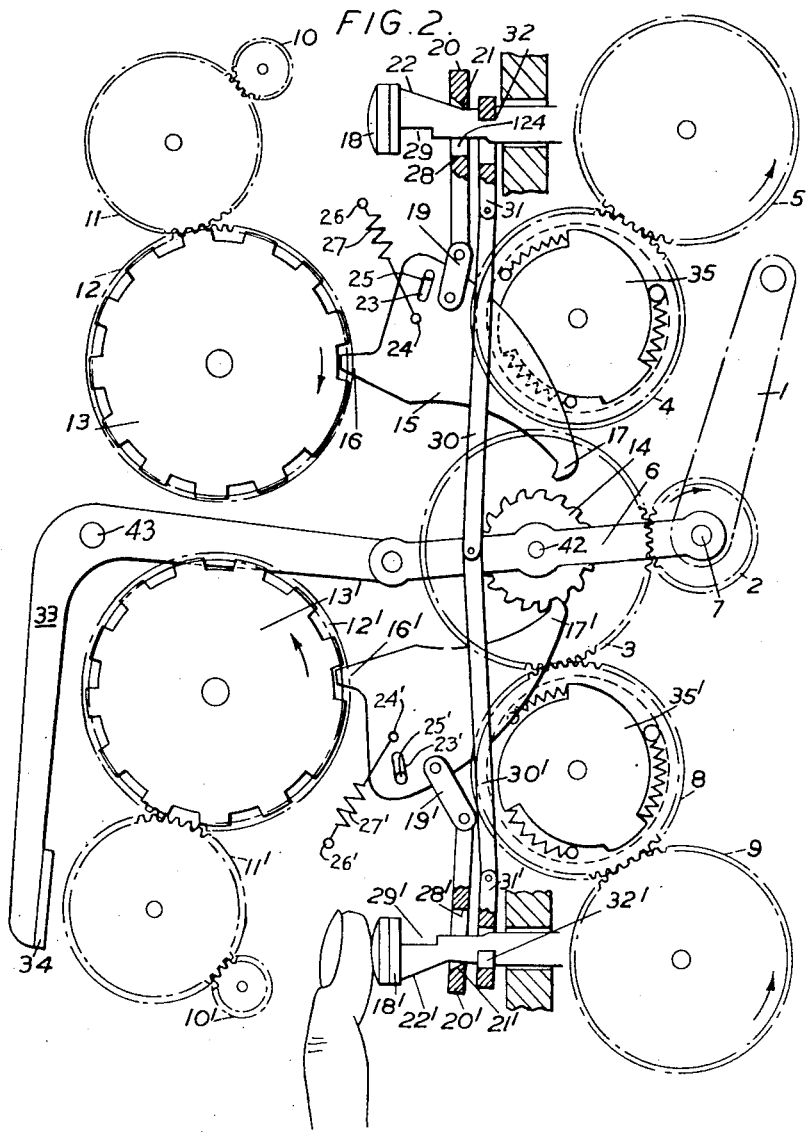

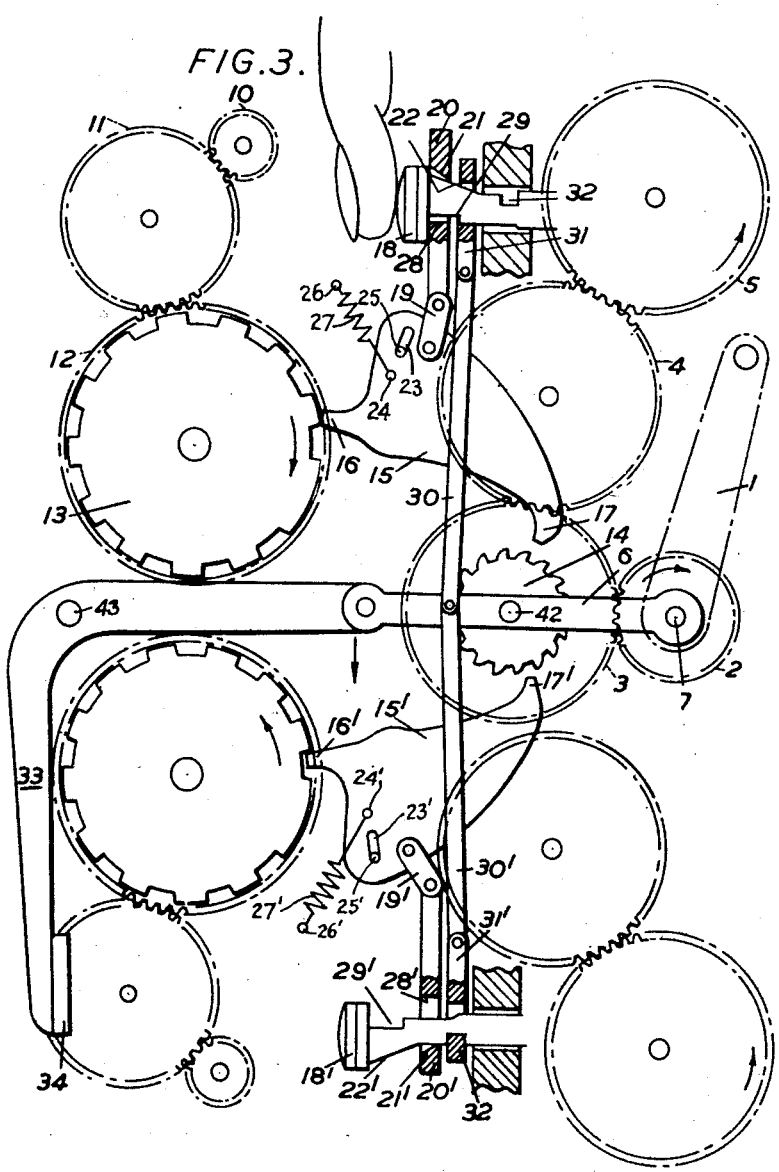

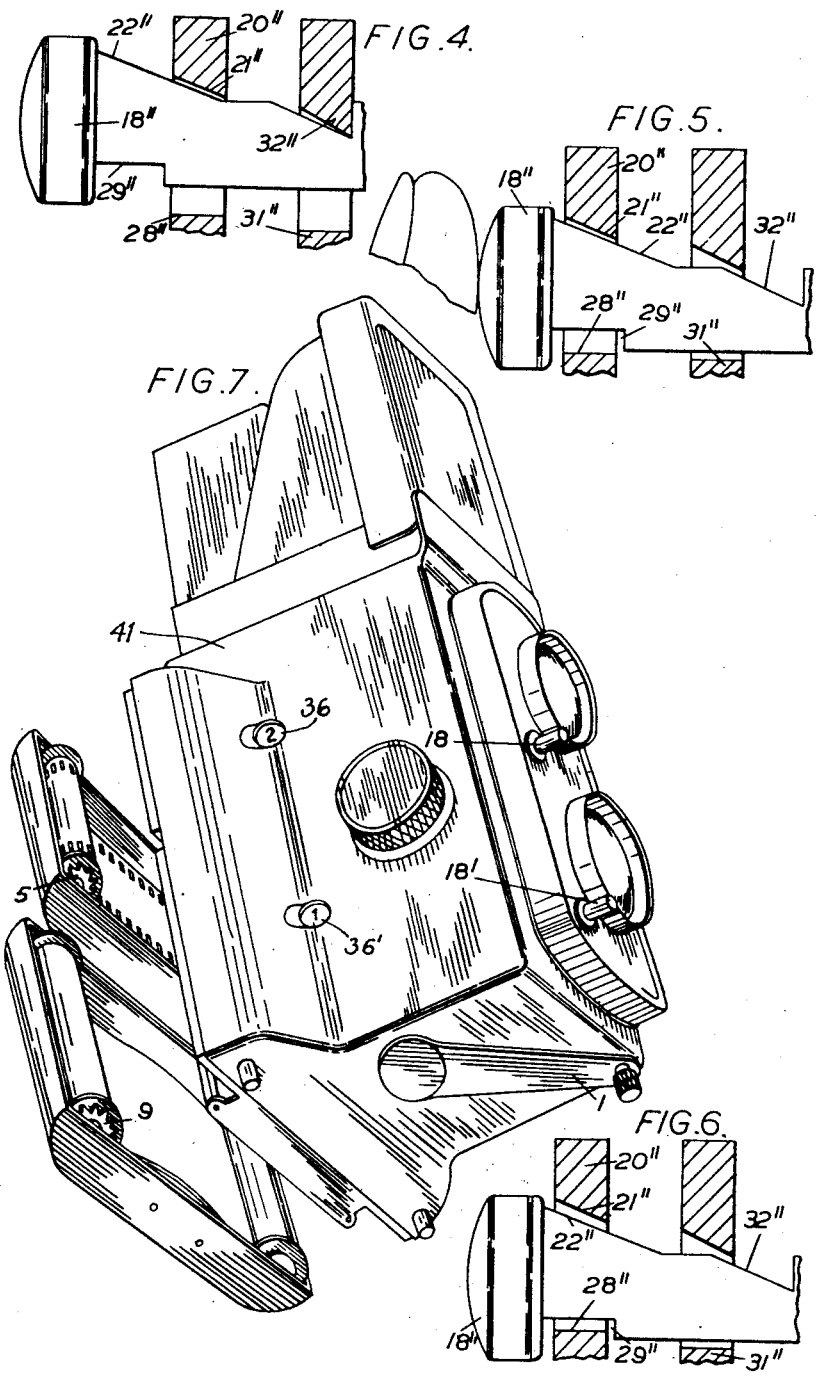

United States Patent Office 2,794,381
Patented June 4, 1957

2,794,381

PHOTOGRAPHIC CAMERA

Reinhold Heidecke and Hermann Friedrich Albrecht, Braunschweig, Germany, assignors to Franke & Heidecke, Fabrik Photographischer Prazisions-Apparate, Braunschweig, Germany, a firm of Germany Application May 16, 1955, Serial No. 508,748
In Germany March 14, 1949

Public Law 619, August 23, 1954
Patent expires March 14, 1969

17 Claims. (Cl. 95—31)

The invention relates to an actuating or drive means adapted for selective coupling to the film winding mechanism of either of a pair of individual photographic cameras mounted within a common housing, with the actuating means being adapted to render either one of such cameras operative in a manner to prevent double exposures and film advancement prior to exposure, while the other of such cameras is fixed in inoperative position. It is an object of the invention to provide a new or generally improved and more satisfactory means for independently actuating the film winding machanism of either of such integrally mounted cameras.

Another object is to provide, for a pair of individual cameras mounted within a common housing, simple and sturdy actuating means adapted for selective and interchangeable coupling with the film winding mechanism of either of such cameras so as to render only one of such cameras operative for making an exposure.

Still another object of the invention is the provision of drive means for actuating the film winding mechanism of either camera of a dual camera construction, which is adapted to lock both of such cameras in inoperative position after each film exposure until the drive means is actuated to advance the exposed film a distance of one exposure frame.

A further object is the provision of actuating means capable of driving the film winding means of either of a pair of integrally mounted cameras only after a film exposure has been made with such camera, and which is prevented from engaging the film winding means of the other camera until such exposed film has been advanced.

A still further object is the provision of selective actuating means, for the film winding mechanism of a twin camera construction, which is simple in construction and operation, and which may be employed with existing camera mechanisms without materially modifying their original function or mode of operation.

These and other desirable objects may be attained in the manner disclosed as an illustrative embodiment of the invention in the following description and in the accompanying drawings forming a part hereof, in which:

Fig. 2 is a view similar to Fig. 1 showing the relative positions of the various parts at the beginning of the shutter operation of the lower camera;

Fig. 3 is a view similar to Fig. 1 showing the arrangement of elements at completion of shutter operation of the upper camera;

Fig. 4 is a partial view showing a modified construction of the upper camera shutter release device and its connecting link means, as it appears when ready for operation at a time when the film winding mechanism is operatively connected to the lower camera;

Fig. 5 is a view similar to Fig. 4 showing the parts after operation of the shutter of the upper camera;

Fig. 6 is a view similar to Fig. 4 showing the shutter release member of the upper camera in locked position after an exposure has been made and before the exposed film has been advanced; and Fig. 7 is a perspective view illustrating the common housing for the individual cameras, with their rear walls in removed position.

The same reference numerals throughout the several views indicate the same parts.

Figure 1:
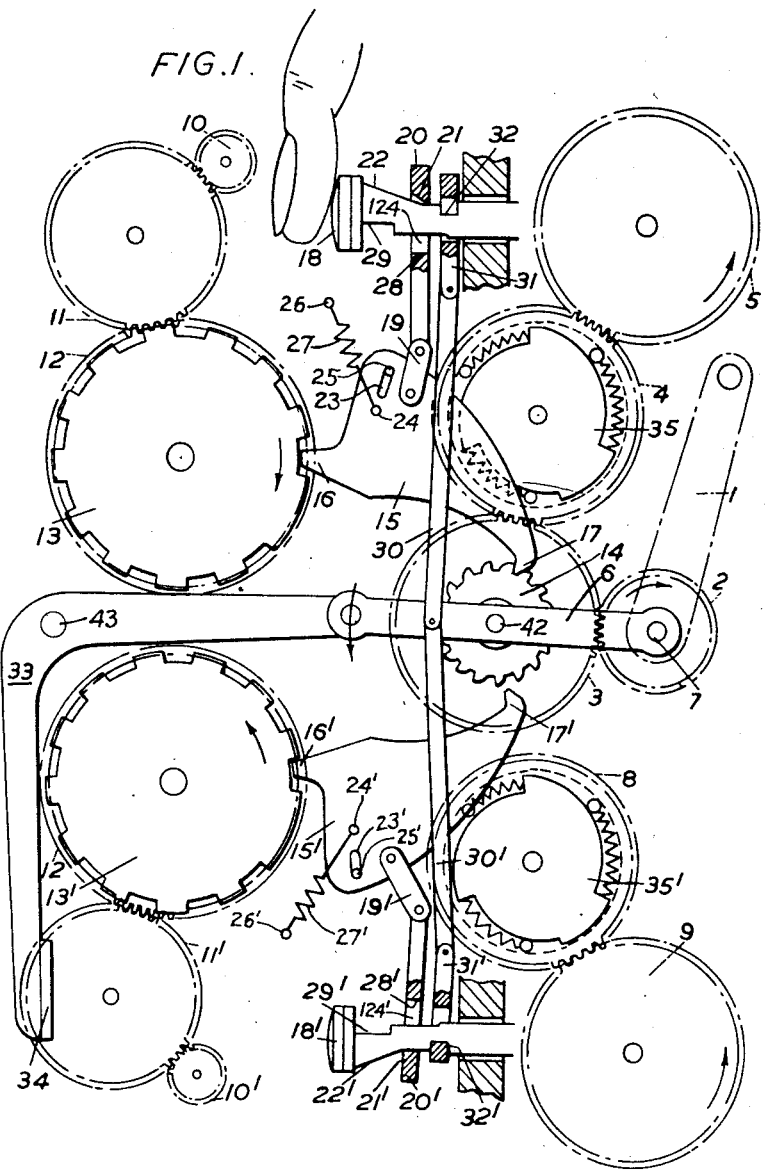
Fig. 1 is a diagrammatic view illustrating the relative locations of the various elements of the actuating means of the present invention and portions of the film winding mechanisms of a pair of integrally mounted cameras at the beginning of the shutter operation of the upper camera.

The invention deals with twin cameras or multiple film cameras mounted in a single housing or casing. Such cameras may be considered as a variation upon the well-known twin lens reflex cameras manufactured by the firm of Franke & Heidecke in Braunschweig, Germany, under the trademarks "Rolleiflex" and "Rolleicord," and widely used in the United States and elsewhere. In the conventional twin lens reflex cameras of this type, there are two chambers in a single housing or casing, both chambers having lenses, the upper chamber being the finder chamber and having a focusing or finder screen and a mirror to reflect the image onto the screen. The lower chamber serves as the picture taking chamber or true camera chamber. Only the lower chamber is provided with a shutter and with a supply of photographic film, in this conventional construction mentioned.

In the variation above mentioned, however, the upper chamber or finder chamber is so constructed that it also may be used as a picture-taking camera, being provided with its own shutter and its own supply of film, and provision being made for shifting the reflex mirror out of the way, when a picture is to be taken with the upper camera. Thus two dissimilar supplies of film may be used, differing from each other in any desired way (e. g., in size, or in speed or sensitivity, or one may be black and white film while the other is color film, etc.) and the operator, after finding the correct field of view and focusing the camera by the use of the upper or finder chamber, has the choice of taking the picture with either the upper camera or the lower camera, depending upon which type or size of film is most suitable for use at the moment. The general features of such a twin camera or multiple film camera are disclosed in Swiss Patent 234,599, granted October 15, 1944, to said firm of Franke & Heidecke, to which patent reference is made for a better understanding of the general features of construction.

In accordance with the present invention, a single drive or actuating means is positioned between the film winding or transporting mechanisms of the two individual cameras of a multiple camera construction, for selective coupling therewith. In one form of the invention, the actuating means, when once coupled to either of such cameras, effectively locks the shutter release or trigger member of the other camera in inoperative position, and prevents film advancement in either camera until an exposure has been made. Upon making an exposure with the camera so coupled, re-exposures of the same film frame or uncoupling of the actuating means therefrom is prevented until the exposed film has been advanced. After film has been advanced through the space of one frame, it cannot be further advanced until an exposure has been made by tripping the shutter associated with the film in question. Thus, the present invention permits only one of a pair of integrally mounted cameras to be operated at a time and at all times automatically insures that the same film frame will not be double-exposed nor advanced prior to exposure.

Referring first to Fig. 7 of the drawings, the main body of the camera is shown in general at 41, and contains the two chambers above mentioned, both serving as cameras (preferably provided with two independently removable backs carrying the film, as shown), the upper chamber also serving as a finder or focusing chamber. Mounted in an externally accessible position is the film winding actuating means such as a crank or handle 1. Referring now to the somewhat diagrammatic views constituting Figs. 1–3, it is seen that the handle 1 is fixed to a shaft 7. The turning movements of the crank 1 are transmitted through the shaft 7, and the gear 2 fixed thereto, to the gear train including gears 3, 4, and 5, diagrammatically illustrated on the drawings for the sake of clarity and simplicity, to rotate the take-up spool of the upper camera. By means of the pin 42, the gear 3 is journaled on a lever or link 6, which in turn is swingably mounted, at one end, on the shaft or pivot pin 7 within the housing 41. With this arrangement, movement of the lever 6 in one direction engages the gear 3 with the gear 4 to operatively connect the crank 1 with the gear 5 (see also Fig. 7) of the take-up spool of the upper camera, while turning the lever 6 in the opposite direction will disengage the gear 3 from the gear 4 and engage it (see Fig. 2) with the gear 8 which in turn is engaged with the gear 9 (see also Fig. 7) of the take-up spool of the lower camera.

As the film of the upper camera is advanced from the supply to the take-up spool, it frictionally engages with and rotates a roller 10 which, through gears 11 and 12, drives a peripherally notched disk 13, connected to the gear 12, and an exposure counter 36 (Fig. 7). In the same manner, the movement of the film of the lower camera is transmitted through roller 10′ and gears 11′ and 12′ to the peripherally notched disk 13′ and exposure counter 36′ (Fig. 7). These parts 10—13 and 10′—13′ are similar to the corresponding parts commonly used in "Rolleiflex" cameras.

Fixed to the gear 3, for rotatable movement therewith, is a ratchet wheel 14 with which are adapted to cooperate the nose portions 17 and 17′ of the upper and lower latch plates or pawls 15 and 15′, respectively. The latch plates 15 and 15′ are each provided with one elongated slot 23 and 23′, respectively, through which extends a fixed pivot pin or mounting pin 25 and 25′, respectively, so that each latch plate is mounted in a somewhat floating manner and is permitted to move with both a rotary and a translational movement relative to its pivot pin and to the stationary parts of the camera body. Each of the latch plates 15 and 15′ is also provided with a tooth or projection 16 and 16′, respectively, which is adapted to drop into the various notches of the film feed metering disks 13 and 13′, respectively, to allow the respective nose 17 or 17′ to engage with the ratchet wheel 14 to stop the film transport movement of the upper or lower camera, respectively, after the proper length of film has been fed.

The latch plate 15 is pivoted to a connecting link 19 which in turn is pivoted to a slide bar or arm 20 provided with an elongated aperture 124 through which passes the shank of the shutter release knob or button 18 of the upper camera. One edge of the shutter release lever 18 has an inclined or cam surface 22 which cooperates with a similarly formed surface or wall 21 of the slide bar aperture 124 to impart a vertical movement to the slide bar 20 as the knob 18 is pressed to operate the shutter to make an exposure. The opposite edge of the shutter release member 18 is provided with a notch or recess 29 which engages with the edge portion 28 of the bar 20 for locking the member 18 in its depressed position after each exposure, as explained below, to prevent re-exposure of the same film frame.

A coiled tension spring 27 is attached at one end to a pin 24 on the latch plate 15, the pin being a little below and approximately in line with the slot 23. The opposite end of the spring 27 is attached to a pin 26 on any suitable part of the camera casing, in such location that the spring pulls obliquely upwardly and leftwardly, as shown, thus tending to slew or turn the plate 15 clockwise on its loose pivot 25 and also tending to raise the entire plate 15 bodily upwardly so that the pivot 25 will be at or near the bottom of the slot 23, rather than at the top thereof. But the spring 27 is a relatively light spring, of weak power, sufficient to move the plate 15 only when it is not obstructed by contact with some other part, and insufficient to cause movement of other parts connected to or making contact with the plate 15, except as otherwise noted below.

The shank of the shutter release member 18 also passes through an aperture formed in a second slide link 31 which is pivotally connected, by means of the intermediate rod or link 30, to the lever 6. The upper edge of the release plunger 18, in addition to having the inclined surface 22, is also formed with an approximately rectangular notch 32 into which a portion of the slide 31 is adapted to drop for locking the shutter release plunger 18 against movement when the lever 6 is turned to engage the gear 3 with the gear 8 of the lower camera, as in Fig. 2.

The above description of the parts 15—32 has referred to the upper camera, for the sake of simplicity. Similar parts, similarly constructed and operating, are provided for the lower camera, but in a relatively inverted position, and are designated by the same respective numerals with the addition of a prime to each. Thus the latch plate of the lower camera is 15′, its spring is 27′, the shutter trigger or release plunger is 18′, and so forth.

Suitable mechanism is employed for swinging the lever 6 upwardly or downwardly, to engage the feeding gear 3 alternatively or selectively with the film driving gears 4 or 8 of the upper or lower camera, respectively. In the first form of the invention, the selective shifting of the lever 6 is accomplished by a shift lever 33, pivoted within the camera casing on the fixed pin 43 and having at one end an externally accessible finger piece 34. The other end of the shift lever 33 is forked to engage a pin on the free end of the lever 6, so that movement of the finger piece 34 in one direction will swing the lever 6 to disengage the gear 3 from the gear 8 and engage it with the gear 4, while movement of the member 34 in the reverse direction will engage the gear 3 with the gear 8 and disengage it from the gear 4.

To prevent partial unwinding or retrograde motion of either spool of film, when the gear 3 is disconnected from that spool, suitable one-way clutches are provided in association with each film winding gear train. The one-way clutch for the upper camera is associated with the gear 4, as shown at 35, and the one-way clutch for the lower camera is associated with the gear 8, as shown at 35′. Each clutch may be of conventional known construction; for example, the gear 4 or 8 may be hollow, containing within it a fixed plate having circumferentially extending grooves or slots of tapered depth, containing balls or rollers pressed by small compression springs toward the shallow ends of the grooves or slots, and bearing outwardly against the inner annular face of the gear, as shown diagrammatically in the drawings. Thus each gear 4 and 8 is free to move clockwise but cannot turn in a counterclockwise direction.

The operation of these parts is as follows: Let it be assumed that there are fresh or unexposed frames of film in proper picture-taking position in both the upper and lower cameras, and that the shutters of both cameras have been tensioned or cocked ready for use, and that the film feeding gearing or film transport mechanism is operatively connected to the upper camera, this being the position of the parts shown in Fig. 1. Further turning of the film feeding crank 1 is now prevented by engagement of the nose 17 in the ratchet gear 14.

If the operator now desires to take a picture with the upper camera, he makes an exposure by pressing the shutter trigger or shutter release button 18 of the upper camera, to operate the shutter in known manner. The parts then assume the position shown in Fig. 3.

In reaching the position of Fig. 3 from the initial position of Fig. 1, the inward pressing of the release button 18 causes the inclined cam edge 22 to raise the link or slide 20. Through the link 19, this draws the latch plate 15 upwardly, swinging it slightly counterclockwise on its pivot 25, to release the nose 17 from the ratchet 14, and also drawing the tail 16 out of the notch in the metering disk 13 which was previously opposite the tail 16, and bringing this tail up to engage with the corner of the next tooth of the disk 13, as shown in Fig. 3, at the same time raising the entire plate 15 so that its pivot pin 25 is now at the lower end of the slot 23 instead of the upper end. The upward motion of the slide 20 brings the part 28 thereof into the notch 20 of the release plunger 18, preventing this plunger from again springing outwardly to its initial position, under the influence of its usual spring (not shown). Also the notch 32 of the shutter release plunger 18 has now moved out from under the slide 31, preventing downward motion of this slide and of the link 30, so that the film feeding gearing must remain connected with the film transport mechanism of the upper camera and cannot at this time be shifted to engage the film transport mechanism of the lower camera. The upper position of the link 30 requires a corresponding upper position of the links 30' and 31' so that the latter lies in the notch 32' of the shutter release plunger 18' of the lower camera, preventing this shutter release plunger from being pressed inward to trip the lower shutter.

At this stage, there is only one effective operation which the user of the camera can perform, and that is to operate the film winding crank 1, to wind a fresh frame of film to the exposure area of the upper camera. The film winding crank cannot be connected to the lower camera, because the part 28 lies in the notch 29 of the shutter release member 18 of the upper camera, and thus holds this shutter release member in a position which prevents downward movement of the links 30 and 30'. The shutter of the lower camera cannot be operated because of the link 31' being engaged in the notch 32'.

The fact that shutter trigger or release 18 of the upper camera is already depressed and has not returned outwardly to its normal position, warns the operator that a picture has been taken with this camera and that another picture cannot be taken until the film has been transported. The fact that the shutter trigger or release 18' of the lower camera is locked in its outward position and cannot be depressed, warns the operator that the lower camera cannot be used at this moment for taking a picture. Thus he knows that neither camera is in condition for picture taking until the film winding or transporting crank 1 has been operated.

Operation of the crank 1 in a clockwise direction when viewed as in Fig. 3, turns the gear 3 counterclockwise, turns the gear 4 clockwise, and causes counterclockwise turning of the gear 5 connected to the take-up spool of the upper camera. As the film is transported, the measuring roller 10 is turned by the movement of the film, in the known manner, and causes rotation of the gears 11 and 12 and the metering disk 13. It will be remembered that at the beginning of the film transport movement, the tail 16 of the latch plate 15 is riding on one of the teeth of the metering disk 13, approximately in the position shown in Fig. 3. As the film moves and the disk 13 moves with it, the smooth part of the periphery of this tooth slides past the tail 16 until the next notch of the disk 13 comes opposite the tail 16, which occurs just before the film has moved sufficiently to bring a fresh unexposed frame into the proper picture-taking position in the camera.

When the next notch comes opposite the tail 16, the tail drops into the notch, thus allowing the spring 27 to turn the latch plate 15 slightly clockwise on its pivot 25, but not quite far enough to bring the nose 17 into the teeth of the ratchet 14. Then just at the instant that the film completes its feeding travel through the distance of one frame, the next tooth of the metering disk 13 hits the tail 16 which has already entered the notch ahead of this tooth, and pulls the entire pawl 15 downwardly against the slight force of the spring 27 and the friction of the slide 20. The first part of this downward movement releases the slide part 28 from the notch 29, so that the plunger 18 can move outwardly under the influence of its spring (not shown) to its normal ready position, thereby withdrawing the inclined cam edge 22 from the edge 21 of the slide 20 so that the latter may complete its downward movement. This downward movement of the slide 20 allows sufficient downward movement of the entire plate or pawl 15 (under the influence of the tooth of the disk 13 as aforesaid) so that the pawl nose 17 is able to enter the teeth of the ratchet 14, thus stopping the rotation of the crank 1 and the feeding of the film at the proper point. During the feeding of the film, the rotation of the crank 1 has also served to tension the shutter ready for the next exposure, through any suitable shutter tensioning connections of known form, such as shown for example in Muller Patent 2,148,636, dated February 28, 1939.

Now a fresh supply of film has been wound into the upper camera, and both cameras are available for taking pictures selectively, one or the other, both of the shutter release plungers or triggers 18 and 18' being fully projected outwardly to their initial or ready positions. However, in this first form of the invention, a picture may be taken only with that camera to which the film winding mechanism is operatively connected. Therefore, if the operator now desires to take a picture with the lower camera rather than the upper one, he must first operate the control member 34 to swing the lever 6 downwardly from the position shown in Figs. 1 and 3 to the position shown in Fig. 2, so as to connect the mechanism to the lower camera. This simultaneously brings the slide 31 into the notch 32 of the shutter trigger of the upper camera, preventing operation of this trigger, and removes the slide 31' from the notch 32' of the shutter trigger of the lower camera, enabling this shutter trigger to be operated. The lower latch plate and associated parts operate in the same way as those described in connection with the upper camera, so that when a picture has been taken by the lower camera, no further picture can be taken by either camera until a fresh supply of film has been wound into exposure position in the lower camera.

In this form of the invention, therefore, there is provided a double exposure prevention mechanism for each of the two associated cameras, preventing either shutter from being operated a second time until a fresh supply of film has been wound; also a film transport lock whereby, after a fresh supply of film has been wound into either camera, no further film winding can take place until an exposure has been made, thus preventing inadvertent wastage of film; and also mechanism to prevent the taking of a picture except in the camera to which the film transport crank 1 is operatively connected at the moment. The result is a rather simple form of multiple film camera, having a high degree of assurance against inadvertent incorrect operation, or in other words, having a rather foolproof mechanism.

The second form of the invention is substantially the same as the first form except with respect to the feature of requiring advance operation of the member 34 in order to select which camera may be used for taking a picture. In this second form, the lever 33 and its operating part 34 are entirely omitted, and the shutter triggers or release plungers 18 and 18' are slightly altered, together with their associated parts, in the manner shown in Figs. 4, 5, and 6. The other features of construction remain the same.

Referring now to Figs. 4, 5, and 6, which show the shutter trigger or release plunger of the upper camera shutter, the parts here are designated by the same numerals used in Figs. 1-3 with the addition of a double prime to each numeral, the shutter trigger itself being designated in Figs. 4-6 as 18″ instead of 18, the notch 29 being now designated as 29″, the slide 20 being shown at 20″, and so forth.

As will readily be seen, the only difference is that the locking notch 32 used in the previous form, instead of having a square or right angle locking corner, is now provided with an inclined or cam shaped edge 32″, cooperating with a correspondingly sloped part of the slide 31″.

The shutter trigger or release plunger for the lower camera is constructed exactly the same as shown in Figs. 4-6, but with the parts in inverted position.

Because of the inclined cam edge 32″ as used in this second form of the invention, in place of the locking notch 32 or 32″ as used in the first form, it is seen that either one of the release members of the two cameras may be pressed to take a picture at will, with either the upper camera or the lower camera, without any previous or advance selection. If, for example, the lever 6 is in its lower position with the gear 3 engaged with the gear 8 rather than the gear 4, and if it is now desired to take a picture with the upper camera rather than the lower one, all that the operator needs to do (assuming that the film winding mechanism has been operated and that a fresh supply of film is in each camera) is to press the shutter trigger or release 18″ of the upper camera. The inward movement of the plunger from the position shown in Fig. 4 to the position shown in Fig. 5, will automatically raise the slide 31″ on account of the cam slope 32″, thus pulling upwardly on the link 30 and thereby raising the lever 6 to bring the gear 3 into mesh with the gear 4 of the upper camera. At the same time the slide 31″ of the lower camera will enter the inclined notch 32″ of the lower camera and will prevent the shutter trigger button of the lower camera from being pressed inwardly so long as the shutter trigger button of the upper camera remains inward, in the position of Fig. 5 or Fig. 6.

Only one shutter at a time may be operated, and the operation of either shutter automatically connects the film winding mechanism to the camera whose shutter was operated. Both shutters then remain locked against operation until the film winding mechanism has been operated to feed a fresh supply of film into the camera with which the last picture was taken. As soon as the film winding operation has been completed, the shutter trigger or release knob springs out again to its initial position, and both of the trigger plungers for both shutters are now released and available for selective operation as desired.

This second form of the invention has certain advantages over the first form, in that it saves the extra operation of moving the member 34 if it is desired to take a picture with the other camera which is not already connected to the film winding mechanism. Under certain circumstances where pictures are to be taken quickly to catch fleeting action, the saving of time by not having to move the member 34 may be quite important. In both forms of the invention, there is effective double exposure prevention, and film wastage prevention, and each camera must be made ready for picture taking before a picture can be taken with either camera. In other words, both cameras must be ready for exposure before either one can be exposed. A high degree of fool-proofness is assured, in a construction which is rather simple and inexpensive for a twin camera of this duplex film type.

It has already been mentioned above that the two films in the two cameras may differ from each other in size. In that event, the gear trains 4, 5, and 8, 9 may be appropriately designed with different gear ratios so that approximately the same turning angle of the crank 1 is sufficient for feeding a fresh frame of film into either camera, notwithstanding the difference in length of film which is to be transported. Or again, if it is preferred that the operator feel approximately the same resistance to turning the crank, regardless of which camera is being used, even though the extent of turning may be different, then the gear trains going to the take-up spools of the respetcive cameras may be appropriately designed with different ratios, so that the film which is wider and therefore produces greater resistance to feeding movement, will offer approximately the same resistance to turning the feeding crank as the film which is narrower and therefore easier to transport.

As is usual in "Rolleiflex" cameras and similar cameras of other makes, it is contemplated that the operation of the film transport or feeding means will at the same time cock or tension the shutter ready for the next exposure. The gear ratios of the film feeds for the two cameras may be so chosen, if desired, that approximately the same resistance is offered to turning the film feeding crank, notwithstanding that different types of shutters requiring different force for setting and tensioning them may be used on the two cameras. This may be especially desirable where one camera is equipped, for example, with a focal plane shutter, while the other camera is equipped with an objective shutter or between-the-lens shutter, the force required for tensioning the two types of shutters being noticeably different unless appropriate adjustments are made in the respective gear ratios as contemplated by the present invention.

It is also contemplated that the change-over of the film winding crank from one camera to the other, whether effected by a separate manual member like the member 34, or effected automatically by operation of the shutter as in Figs. 4-6, may be appropriately coupled to some other part of the camera, such as an exposure meter control member, or a locking device which compels the film transport mechanism to remain connected to only one of the two cameras if the film in the other camera is exhausted. Or again, the film transport mechanism control may be operatively connected to a view finder mechanism, if separate view finders are used for the separate cameras, in such a way that one view finder cannot be used unless the film transport mechanism is operatively connected to the particular camera for which that view finder is intended.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

What is claimed is:

1. A multi-film photographic camera comprising a casing containing two separate exposure chambers for taking separate pictures, means for holding separate supplies of film for the two chambers, separate film feeding parts for each chamber, a separate shutter actuating member for each chamber, a common manually operable film feed actuating member adapted to be operatively connected selectively to the film feeding parts of either chamber and operatively disconnected from the film feeding parts of the other chamber, interlocking means blocking actuation of the shutter actuating member of either chamber so long as said film feed actuating member is operatively connected to the film feeding parts of the other chamber, and means preventing operative disconnection of said film feed actuating member from the film feeding parts of either chamber, following the taking of a picture in that chamber, until the film feed actuating member has been operated to feed a fresh unexposed frame of film to the chamber in which the picture has been taken.

2. A multi-film photographic camera comprising a casing containing two separate exposure chambers for taking separate pictures, means for holding separate supplies of film for the two chambers, separate film feeding parts for each chamber, a separate shutter actuating member for each chamber, a common manually operable film feed actuating member adapted to be operatively connected selectively to the film feeding parts of either chamber and operatively disconnected from the film feeding parts of the other chamber, interlocking means blocking actuation of the shutter actuating member of either chamber so long as said film feed actuating member is operatively connected to the film feeding parts of the other chamber, means preventing operative disconnection of said film feed actuating member from the film feeding parts of either chamber, following the taking of a picture in that chamber, until the film feed actuating member has been operated to feed a fresh unexposed frame of film to the chamber in which the picture has been taken, and means effective upon operation of said film feed actuating member to feed a fresh film frame, for rendering one of said shutter actuating members operable.

3. A multi-film photographic camera comprising a casing containing two separate exposure chambers for taking separate pictures, means for holding separate supplies of film for the two chambers, separate film feeding parts for each chamber, a separate shutter actuating member for each chamber, a common manually operable film feed actuating member adapted to be operatively connected selectively to the film feeding parts of either chamber and operatively disconnected from the film feeding parts of the other chamber, interlocking means blocking actuating of the shutter actuating member of either chamber so long as said film feed actuating member is operatively connected to the film feeding parts of the other chamber, means preventing operative disconnection of said film feed actuating member from the film feeding parts of either chamber, following the taking of a picture in that chamber, until the film feed actuating member has been operated to feed a fresh unexposed frame of film to the chamber in which the picture has been taken, and means effective upon operation of said film feed actuating member to feed a fresh film frame, for rendering both of the shutter actuating members selectively and alternatively operable.

4. A multiple camera construction comprising two cameras joined to each other, each camera having its own separate film supply, film take-up roll, shutter, and shutter release member, a common film winding member serving both cameras, first shiftable means for operatively connecting said winding member selectively to the film take-up roll of either camera, means operated by actuating of either shutter release member for rendering both shutter release members inoperative, and means operated by actuation of said film winding member following the making of an exposure for rendering at least one of said shutter release members again operative.

5. A multiple camera construction comprising two cameras joined to each other, each camera having its own separate film supply, film take-up roll, shutter, and shutter release member, a common film winding member serving both cameras, first shiftable means for operatively connecting said winding member selectively to the film take-up roll of either camera, means controlled by the position of said first shiftable means for rendering one shutter release member inoperative so long as said first shiftable means remains in a position to connect said winding member to the take-up roll of the camera associated with the other shutter release member, means operated by actuation of either shutter release member for rendering the actuated release member inoperative for further actuation, and means operated by actuation of said film winding member for restoring the actuated shutter release member to operative condition capable of further actuation.

6. A multiple camera construction comprising two cameras joined to each other, each camera having its own separate film supply, film take-up roll, shutter, and shutter release member, a common film winding member serving both cameras, first shiftable means for operatively connecting said winding member selectively to the film take-up roll of either camera, means controlled by the position of said first shiftable means for rendering one shutter release member inoperative so long as said first shiftable means remains in a position to connect said winding member to the take-up roll of the camera operated by the other shutter release member, means operated by actuation of either shutter release member for rendering the actuated release member inoperative for further actuation, and for locking said first shiftable means in position to connect said winding member to the take-up roll of the camera whose shutter release member was actuated, and means operated by actuating of said film winding member for restoring the actuated shutter release member to operative condition capable of further actuation.

7. A multiple camera comprising two cameras joined together, each camera having its own separate film take-up spool and shutter release member, a manually operable film winding member common to both cameras, a movable member, a gear rotatably mounted on said movable mmeber and also bodily movable therewith, said gear serving to connect said film winding member operatively to the take-up spool of one camera when said movable member is in one position and to connect it operatively to the take-up spool of the other camera when said movable member is in another position, each of said shutter release members having a notch therein, and a blocking member shiftable into and out of engagement with each notch and operatively connected to said movable member to be moved thereby into its associated notch of one camera when said movable member is shifted to connect said film winding member to the other camera.

8. A construction as defined in claim 7, in which each of said notches has an inclined part tending to cam its blocking member out of the notch when it is attempted to operate the shutter release member while its blocking member is in its notch.

9. A construction as defined in claim 7, in which each of said notches is so shaped that the presence of its blocking member in said notch prevents operation of the shutter release member having such notch.

10. A multiple camera comprising a first camera and a second camera joined together, each camera having its own lens, shutter, shutter release member, film take-up spool, driving gear for driving said take-up spool, film metering wheel, and a movable latch pawl controlled in part by said film metering wheel, characterized by a film feeding gear shiftable to mesh with the driving gear of either camera while being disconnected from the driving gear of the other camera, a ratchet operatively connected with said feeding gear and in position to be within the range of movement of the latch pawl of the first camera and outside the range of movement of the latch pawl of the second camera when the feeding gear is meshed with the driving gear of the first camera, and vice versa, and a one-way clutch associated with the driving gear of each camera to hold said driving gear against retrograde motion when said driving gear is disconnected from said feeding gear.

11. A construction as defined in claim 10, further including a connection between each latch pawl and the shutter release member of the same camera, to unlatch the pawl from said ratchet when the connected shutter release member is actuated to operate the shutter to make an exposure.

12. A construction as defined in claim 10, further including an operative connection between the shutter release member of the first camera and the shutter release member of the second camera, to prevent simultaneous actuation of both release members.

13. A construction as defined in claim 10, further including means interconnecting said feeding gear and said pawls and shutter release members of both cameras, said means being effective to block full exposure-making operation of the shutter release member of either camera unless said feeding gear is in mesh with the driving gear of that camera, said means further being effective, upon exposure-making operation of either release member, to block further exposure-making operation of both shutter release members and to prevent disconnecting said feeding gear from the driving gear of the camera in which the exposure was made, until said feeding gear has been operated sufficiently to feed a fresh supply of film to the camera in which the exposure was made, said means also being effective to unblock the shutter release member of at least one camera, upon completion of feeding a fresh supply of film to the camera in which the exposure was made, so that another exposure may be made.

14. A construction as defined in claim 13, in which said interconnecting means automatically meshes said feeding gear with the driving gear of the camera in which an exposure is to be made, if not already meshed therewith, by the act of operating the shutter release member of the camera in which the exposure is to be made.

15. A multiple camera comprising a first camera and a second camera joined to each other, each camera having a separate lens, shutter, shutter release member, film take-up spool, and driving gear for driving the take-up spool to feed a fresh frame of film into exposure position within the camera after a previous exposure has been made therein, and interconnecting means preventing exposure-making operation of the shutter release members of both cameras, after an exposure has been made in either one of the cameras, until after a fresh frame of film has been fed into the camera in which the exposure was made.

16. A multiple camera comprising a first camera and a second camera joined to each other, each camera having a separate lens, shutter, shutter release member, film take-up spool, and driving gear for driving the take-up spool to feed a fresh frame of film into exposure position within the camera after a previous exposure has been made therein, means effective upon exposure-making operation of the shutter release member of either camera for locking both shutter release members against further operation, and means effective upon feeding a fresh frame of film into the camera in which the exposure was made for unlocking at least one of the shutter release members for exposure-making operation.

17. A multiple camera comprising a first camera and a second camera joined to each other in a common body, each camera having a separate lens, shutter, shutter release member, film take-up spool, and driving gear for driving the take-up spool to feed a fresh frame of film into exposure position within the camera after a previous exposure has been made therein, a film feeding crank mounted on said common body and having a crank handle accessible for manual actuation, a lever mounted for swinging movement about the axis of rotation of said crank as a center of rotation, an intermediate gear journalled on said lever to swing bodily therewith when said lever is swung and meshing with said driving gear of one camera when said lever is swung to one position and meshing with said driving gear of the other camera when said lever is swung to another position, said intermediate gear being operatively connected to said crank to be turned thereby, and means including links connected to said lever and engaging the shutter release members of the respective cameras for preventing full shutter releasing operation of the shutter release member of either camera except when said lever is swung to a position for meshing said intermediate gear with said driving gear of the particular camera whose shutter release member is being operated.

References Cited in the file of this patent

UNITED STATES PATENTS

| | | |
|---|---|---|
| 2,521,404 | Pentland | Sept. 5, 1950 |
| 2,531,376 | Langdon | Nov. 21, 1950 |

FOREIGN PATENTS

| | | |
|---|---|---|
| 234,599 | Switzerland | Nov. 21, 1950 |